United States Patent
Huras et al.

(10) Patent No.: US 7,444,482 B2
(45) Date of Patent: *Oct. 28, 2008

(54) STORAGE POOLS WITH WRITE ATOMICITY

(75) Inventors: Matthew Albert Huras, Ajax (CA); Thomas Stanley Mathews, Austin, TX (US); Lance Warren Russell, Rosanky, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/955,505

(22) Filed: Dec. 13, 2007

(65) Prior Publication Data

US 2008/0098184 A1 Apr. 24, 2008

Related U.S. Application Data

(63) Continuation of application No. 11/117,143, filed on Apr. 28, 2005, now Pat. No. 7,346,748.

(51) Int. Cl.
*G06F 12/00* (2006.01)
(52) U.S. Cl. .................. 711/154; 711/112; 711/114; 711/151; 711/156; 711/171
(58) Field of Classification Search ................ 711/154, 711/112, 114, 151, 156, 171
See application file for complete search history.

(56) References Cited

U.S. PATENT DOCUMENTS

| 5,668,958 | A | 9/1997 | Bendert et al. |
| 5,701,480 | A | 12/1997 | Raz |
| 5,892,898 | A | 4/1999 | Fujii et al. |
| 5,960,464 | A | 9/1999 | Lam |
| 6,496,840 | B1 | 12/2002 | Uceda-Sosa et al. |

OTHER PUBLICATIONS

"Replication and Recovery of Database State Information in Fault Tolerant Clusters", IBM Technical Disclosure Bulletin, v36, n10. 10-93, 5 pages, Oct. 10, 1993.
"Write Atomicity with Storage Hardware", IBM Technical Disclosure Bulletin, n2, 07-90, 3 pages, Jul. 1, 1990.
Anderson et al., "Robust Distributed Storage Using Erasure Codes", 2002, pp. 1-10.
"VxFS Veritas File System: System Administrator's Guide", 1997, SCO UnixWare, Chapter 5: Performance and Tuning.

*Primary Examiner*—Stephen C Elmore
(74) *Attorney, Agent, or Firm*—Duke W. Yee; Matthew W. Baca; Mari Stewart

(57) ABSTRACT

A method, apparatus, and computer program product for storage pools with write atomicity. An abstraction manager enforces write atomicity and disallows options which are inconsistent with write atomicity. The abstraction manager constructs through a physical device interface a logical continuous view of a storage pool in a manner consistent with write atomicity. Applications collect information specific to write atomicity from the abstraction manager through an application interface.

13 Claims, 3 Drawing Sheets

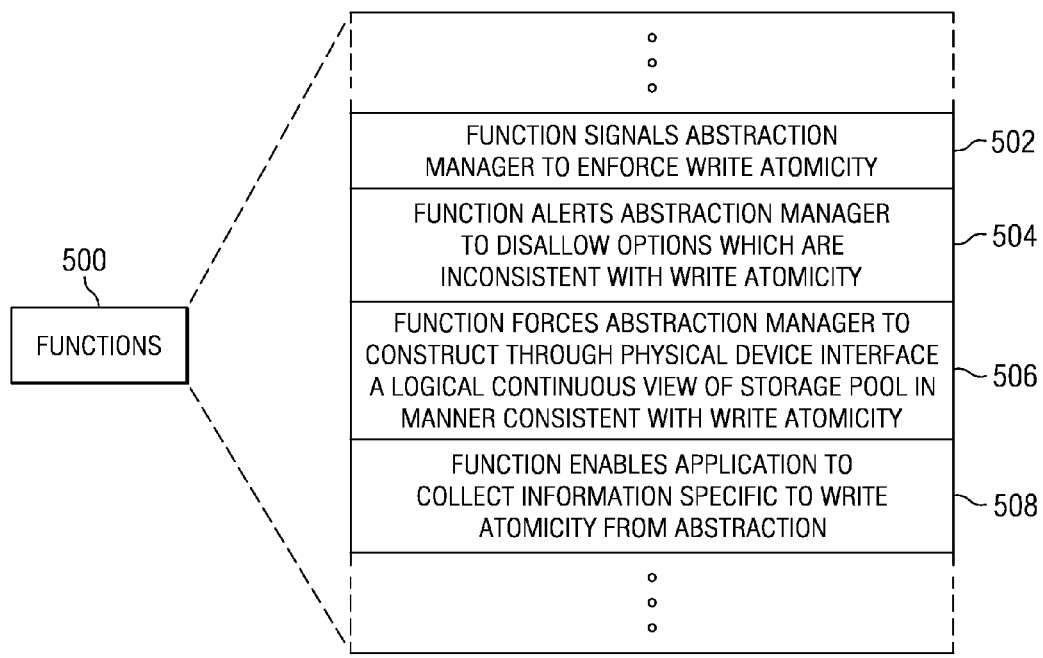
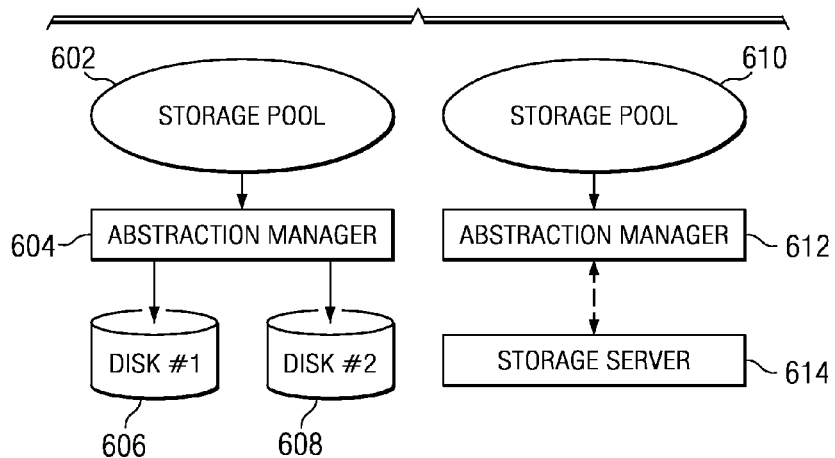

STORAGE POOLS WITH WRITE ATOMICITY

This application is a continuation of application Ser. No. 11/117,143, filed Apr. 28, 2005, status, now allowed as U.S. Pat. No. 7,346,748.

BACKGROUND OF THE INVENTION

1. Technical Field:

The present invention relates generally to an improved data processing system and, in particular, to a method, system and computer program product for optimizing performance in a data processing system. Still more particularly, the present invention provides a method, system, and computer program product for storage pools with write atomicity.

2. Description of Related Art:

One of the key measurements of computer application performance is how quickly computer applications can recover from an unexpected system halt. Unexpected system halts come from a variety of sources ranging from software failures to hardware failures to environmental factors, such as power outages. Complex computer applications, such as file systems and databases, maintain the state of transactions and logs of in-process transactions to files. After an abrupt failure, restoring the state of transactions and restarting the transactions stored in buffers can take a significant amount of time.

Complicating this environment is the fact that computer applications have minimal control over how in-flight transactions are processed by other software layers, particularly the operating system. A partial write is defined as successfully writing only a fraction of the data requested, which is particularly troublesome in this context. The possibility of partial writes significantly complicates computer application recovery code and recovery times because the computer application must recognize that a transaction may have been partially completed, check if this is true, and then initiate recovery if the transaction was only partially completed. Recovery is accomplished by either completing the partial transaction, or by removing it in its entirety by setting specific flags in persistence storage. All of this complexity could be avoided if writes were atomic, such that the write is either successful totally or not at all.

Therefore, it would be advantageous to have an improved method, system, and computer program product for storage pools with write atomicity.

SUMMARY OF THE INVENTION

The present invention provides a method, system, and computer program product for storage pools with write atomicity. An abstraction manager enforces write atomicity and disallows options which are inconsistent with write atomicity. The abstraction manager constructs through a physical device interface a logical continuous view of a storage pool in a manner consistent with write atomicity. Applications collect information specific to write atomicity from the abstraction manager through an application interface.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a block diagram of functions required for storage pools with write atomicity, according to a preferred embodiment of the present invention; and FIG. 6 is a block diagram of contrasting examples of a storage pool without write atomicity and a storage pool with write atomicity, according to a preferred embodiment of the present invention.

DETAILED DESCRIPTION OF THE PREFERRED EMBODIMENT

Figure 1:
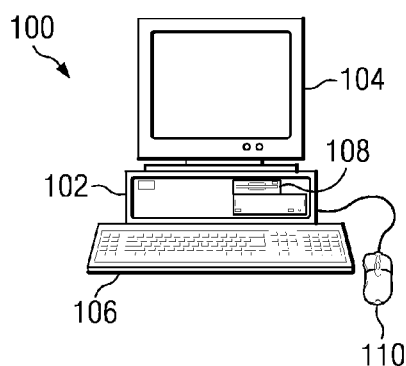
FIG. 1 is a pictorial representation of a data processing system in which the present invention may be implemented, according to a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
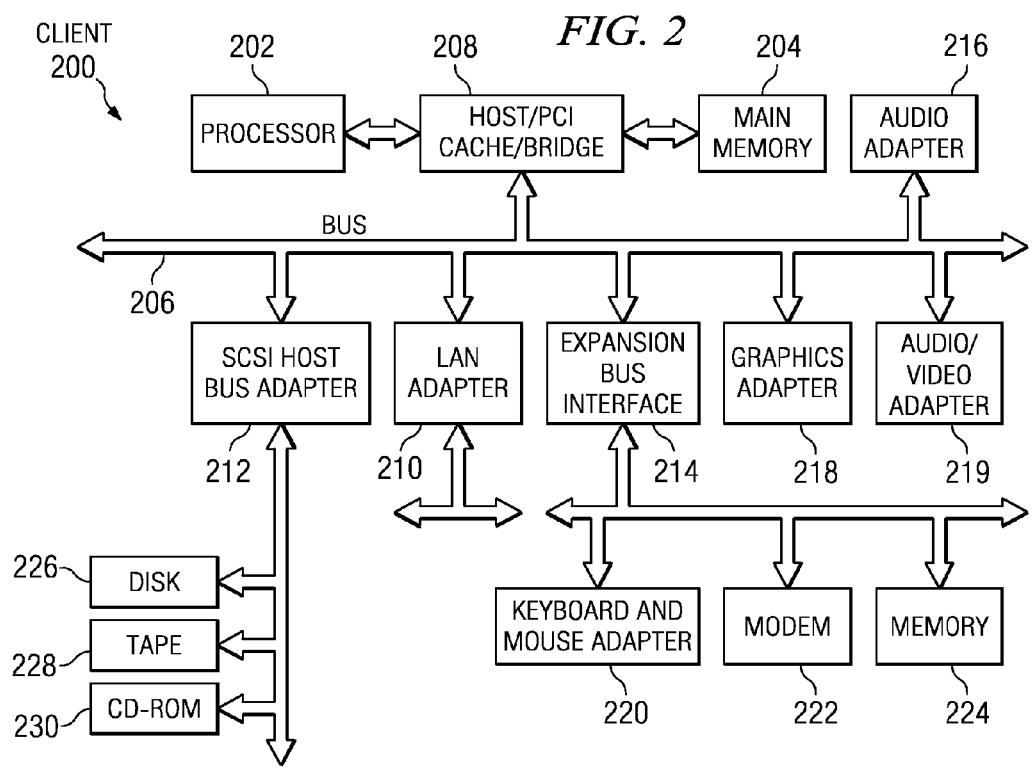
FIG. 2 is a block diagram of a data processing system in which the present invention may be implemented, according to a preferred embodiment of the present invention.

With reference now to FIG. 2, a block diagram of a data processing system is shown in which the present invention may be implemented, according to a preferred embodiment of the present invention. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention is a method, system and computer program product by which a storage pool provides an application interface to set write atomicity for a selected pool, and by which a storage pool manager enforces write atomicity within its pool. Applications, such as databases and file systems, execute on host systems by accessing virtualized storage pools. These storage pools are constructed by the host systems using file system managers and/or logical volume managers, and are physically backed by actual persistence storage residing locally or at one or more remote storage servers. As applications issue Input/Output (I/O) requests to the storage pools, these requests are passed through the host file system manager, host logical volume manager, and host device drivers. In the case of remote storage servers, the requests are then converted to an appropriate form and transmitted to the remote storage device.

Figure 3:
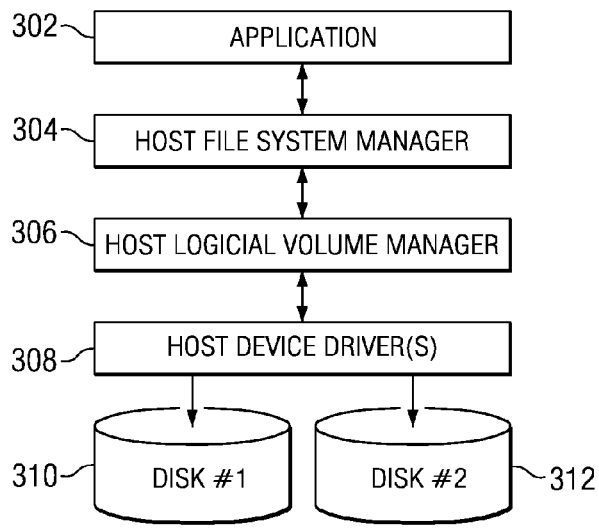
FIG. 3 is a block diagram of the entire pipeline for storage pools with write atomicity, according to a preferred embodiment of the present invention.

FIG. 3 is a block diagram of an exemplary pipeline for storage pools with write atomicity, according to a preferred embodiment of the present invention, which may be implemented using components of a data processing system, such as data processing system 200 in FIG. 2. In this illustrative example, application 302 opens a file and issues a write request of specific length at a specific offset. Next, host file system manager 304 converts the write request to a logical volume request and forwards this request to host logical volume manager 306. Host logical volume manager 306 then converts the converted write request to a physical device request and forwards the physical device request to host device driver(s) 308. Finally, host device driver(s) 308 writes the data associated with the write request for application 302 to physical devices such as persistent media, in this example locally attached disk #1 310 and locally attached disk #2 312. The entire pipeline (host file system manager, host logical volume manager, and host device driver) is defined as the host storage software stack.

As application write requests traverse the host storage software stack, these requests may be fragmented for many reasons. For example, the contiguous view of storage presented to application 302 through the storage pool may not be contiguous on the physical storage media, such as locally attached disk #1 310 and locally attached disk #2 312. In fact, an application write request might actually span the boundary between two physical devices. In this case the storage pool has no recourse other than to fragment the application write request, sending part of the write request to one physical device and the remainder of the write request to another physical device.

Figure 4:
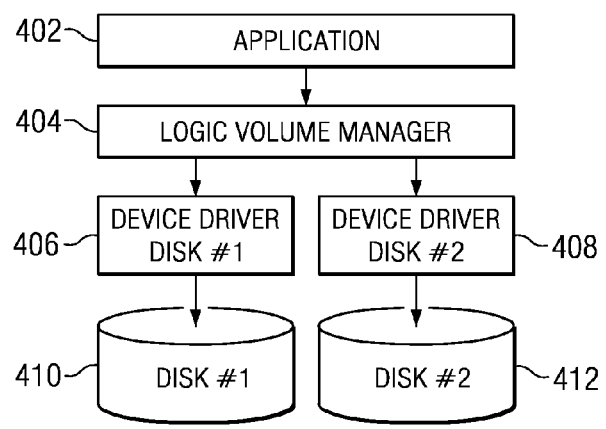
FIG. 4 is a block diagram of the fragmentation process for storage pools without write atomicity.

FIG. 4 is a block diagram of the process of data fragmentation for storage pools without write atomicity. Application 402 issues a write request to logical data partitions 1000 & 1001. Logical volume manager 404 converts the write request to a physical device request and forwards the physical device request to device driver disk #1 406 and device driver disk #2 408. Because logical data partition 1000 resides on disk #1 410 and logical data partition 1001 resides on disk #2 412, logical volume manager 404 fragments the write request, sending part of the write request to disk #1 410 and the other part of the write request to disk #2 412. This fragmentation introduces the possibility of a partial success for an application's request when the write request succeeds to one physical device, such as disk #1 410, and fails to the other physical device, such as disk #2 412.

An additional reason for fragmenting includes the host system administrator has configured the storage pool so that write requests are fragmented at a specific size. The fragments are then sent to different physical devices. This procedure is termed striping. Another reason for fragmenting is when the storage pool, for performance or device characteristic reasons, elects to fragment or combine write requests to an optimum size. Independent of the reason, the possibility of a partial success arises anytime an application's write request is fragmented.

In the host storage software stack, there is a module whose purpose is to interface directly with each physical storage device in the storage pool and present a logical view of the storage pool to applications. This module is typically the host logical volume manager, such as host logical volume manager 306 in FIG. 3. Some systems do not have logical volume managers, but integrate this function into the host file system manager, such as host file system manager 304. The mechanism of the present invention applies to both of these approaches. This module is defined as the abstraction manager. The abstraction manager is the only host module that has both knowledge of the physical device composition of the storage pools and interaction with the software modules controlling those physical devices.

FIG. 5 is a block diagram of functions required for storage pools with write atomicity, according to a preferred embodiment of the present invention. The mechanism of the present invention adds a state for write atomicity to the abstraction manager. This state is set at the time the storage pool is configured. This state signals the abstraction manager to enforce write atomicity at this level, as shown in function 502. This state also alerts the abstraction manager to disallow options, such as striping, which are inconsistent with write atomicity, as shown in function 504. Additionally, this state forces the abstraction manager to construct through the physical device interface a logical continuous view of the storage pool in a manner consistent with write atomicity, as shown in function 506. Finally, this state enables the application to collect certain information specific to write atomicity from the abstraction manager through an application interface, as shown in function 508.

In addition to constructing a state in the abstraction manager, the mechanism of the present invention constructs a new application interface for the purpose of applications querying the abstraction manager to collect certain information specific to write atomicity for a selected storage pool. This application interface is accessible to all applications with the appropriate permission. Because the applications have no direct knowledge of the physical devices underlying the storage pool, in order to support atomic write operations over all the devices in the storage pool, the abstraction manager may place size and alignment restrictions on write requests. In addition, the abstraction manager may have size and alignment recommendations for optimal performance. These values are conveyed to the application through the application interface.

The mechanism of the present invention modifies the abstraction manager to fail any write request to the storage pool which cannot be completed atomically. The abstraction manager returns to the application through the application interface the reason for this write request failure, such as the write requested violated alignment or size restrictions, the write requested spanned physical devices, etc.

Because the abstraction manager abstracts the physical devices into the storage pool, one of the abstraction manager's functions is to translate all application I/O requests directed to the pool through a physical device interface into its physical device components and forward the appropriate request to each individual storage device. To support write atomicity, if a physical device is intelligent it is necessary for the abstraction manager to convey to the physical device through a physical device interface that particular writes are not to be fragmented. The mechanism of the present invention modifies the abstraction manager to perform this task. However, some physical devices may not be able to support write atomicity. Therefore, the mechanism of the present invention modifies the abstraction manager to detect this condition through the physical device interface and to disallow configuration of write atomicity for such a physical device.

FIG. 6 is a block diagram of contrasting examples of a storage pool without write atomicity and a storage pool with write atomicity, according to a preferred embodiment of the present invention. Storage pool 602, which has no write atomicity, sends a logical write request to abstraction manager 604. Abstraction manager 604 detects that in this example the logical write is translated into writes to two separate physical devices, disk #1 606 and disk #2 608. Because there is no atomicity in storage pool 602, the write request is fragmented and actually forwarded to the two separate devices, disk #1 606 and disk #2 608. In contrast, storage pool 610, which has write atomicity, sends a logical write request to abstraction manager 612. Abstraction manager 612 detects that in this example the logical write request is targeted to an intelligent storage server, storage server 614. Abstraction manager 612 marks the logical write request as atomic. Then the host device driver converts the logical write request to its appropriate form and transmits it to storage server 614 over the network, with the transmission indicating that the write request is to be atomic. Storage server 614 interprets the write request and writes the data to the persistent storage atomically. If the write request must be fragmented, storage server 614 returns an indication of write request failure.

Therefore, the method of the present invention, described above, simplifies recovery code and improves recovery time by eliminating partial writes through the provision of storage pools with write atomicity.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for storage pools with write atomicity, the data processing system comprising:

signaling means for signaling an abstraction manager to enforce write atomicity in a selected storage pool;

alerting means for alerting the abstraction manager to place size and alignment restrictions on write requests to the selected storage pool and disallow options which are inconsistent with write atomicity wherein an option which is inconsistent with write atomicity is an option associated with fragmenting a write request, and wherein the abstraction manager disallows the option by failing any write request associated with the option;

forcing means for forcing the abstraction manager to construct, through a physical device interface, a logical continuous view of the selected storage pool in a manner consistent with write atomicity, wherein the abstraction manager conveys to a physical device in the selected storage pool, through the physical device interface, that a particular write request is not to be fragmented; and enabling means for enabling an application to collect information specific to write atomicity from the abstraction manager through an application interface.

2. The data processing system of claim 1, further comprising:

adding means for adding a state for write atomicity to the abstraction manager, wherein the state is set at the time a storage pool is configured.

3. The data processing system of claim 1, further comprising:

constructing means for constructing the application interface for the purpose of the application querying the abstraction manager to collect certain information specific to write atomicity wherein the application interface is accessible to the application with the appropriate permission.

4. The data processing system of claim 1, wherein the abstraction manager fails a write request to the storage pool which cannot be completed atomically.

5. The data processing system of claim 1, wherein the abstraction manager returns to the application through the application interface a reason for a write request failure.

6. The data processing system of claim 1, wherein the abstraction manager conveys to an intelligent physical device through the physical device interface that a write request is not to be fragmented.

7. The data processing system of claim 1, wherein the abstraction manager detects through the physical device interface that a physical device may not be able to support write atomicity, and the abstraction manager disallows configuration of write atomicity for this physical device.

8. A computer program product on a computer-readable recordable-type medium for storage pools with write atomicity, the computer program product comprising:

first instructions for signaling an abstraction manager to enforce write atomicity in a selected storage pool;

second instructions for alerting the abstraction manager to place size and alignment restrictions on write requests to the selected storage pool and disallow options which are inconsistent with write atomicity, wherein an option which is inconsistent with write atomicity is an option associated with fragmenting a write request, and wherein the abstraction manager disallows the option by failing any write request associated with the option;

third instructions for forcing the abstraction manager to construct, through a physical device interface, a logical continuous view of the selected storage pool in a manner consistent with write atomicity, wherein the abstraction manager conveys to a physical device in the selected storage pool, through the physical device interface, that a particular write request is not to be fragmented; and fourth instructions for enabling an application to collect information specific to write atomicity from the abstraction manager through an application interface.

9. The computer program product of claim 8, further comprising:

fifth instructions for adding a state for write atomicity to the abstraction manager, wherein the state is set at the time a storage pool is configured.

10. The computer program product of claim 8, further comprising:

fifth instructions for constructing the application interface for the purpose of the application querying the abstraction manager to collect certain information specific to write atomicity wherein the application interface is accessible to the application with the appropriate permission.

11. The computer program product of claim 8, wherein the abstraction manager fails a write request to the storage pool which cannot be completed atomically.

12. The computer program product of claim 8, wherein the abstraction manager returns to the application through the application interface a reason for a write request failure.

13. The computer program product of claim 8, wherein the abstraction manager conveys to an intelligent physical device through the physical device interface that a write request is not to be fragmented.

* * * * *